(12) United States Patent
Sakurada et al.

(10) Patent No.: US 11,677,279 B2
(45) Date of Patent: Jun. 13, 2023

(54) MAGNET MATERIAL, PERMANENT MAGNET, ROTARY ELECTRICAL MACHINE, AND VEHICLE

(71) Applicant: KABUSHIKI KAISHA TOSHIBA, Tokyo (JP)

(72) Inventors: Shinya Sakurada, Saitama Saitama (JP); Masaya Hagiwara, Yokohama Kanagawa (JP); Keiko Okamoto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 335 days.

(21) Appl. No.: 16/809,624

(22) Filed: Mar. 5, 2020

(65) Prior Publication Data

US 2020/0204014 A1 Jun. 25, 2020

(30) Foreign Application Priority Data

Sep. 17, 2019 (JP) .............................. JP2019-168882

(51) Int. Cl.
*H02K 1/02* (2006.01)
*C22C 38/00* (2006.01)
(Continued)

(52) U.S. Cl.
CPC .............. *H02K 1/02* (2013.01); *C22C 38/00* (2013.01); *H01F 1/0557* (2013.01); *H02K 1/17* (2013.01);
(Continued)

(58) Field of Classification Search
CPC .............. H02K 1/02; H02K 1/17; H02K 1/27; H02K 7/1823; C22C 38/00; C22C 38/10;
(Continued)

(56) References Cited

U.S. PATENT DOCUMENTS

| 2018/0061539 A1 | 3/2018 | Hagiwara et al. |
| 2018/0062455 A1 | 3/2018 | Hagiwara et al. |

(Continued)

FOREIGN PATENT DOCUMENTS

| JP | 8-191006 | 7/1996 |
| JP | 9-74006 | 3/1997 |

(Continued)

OTHER PUBLICATIONS

Kirchmayr, et al., H.P.J. Wijn (Ed.), Landolt-Bornstein, New Series III/19d2, Berlin (1990).

(Continued)

*Primary Examiner* — Anthony M Liang
*Assistant Examiner* — Danny N Kang
(74) *Attorney, Agent, or Firm* — Amin, Turocy & Watson, LLP (57) ABSTRACT

The magnet material is represented by a composition formula 1: $(R_{1-x}Y_x)_a M_b A_c$, where R is at least one element selected from the group consisting of rare-earth elements, M is at least one element selected from the group consisting of Fe and Co, A is at least one element selected from the group consisting of N, C, B, H and P, x is a number satisfying $0.01 \leq x \leq 0.8$, a is a number satisfying $4 \leq a \leq 20$ atomic %, b is a number satisfying b=100−a−c atomic %, and c is a number satisfying $0 \leq c \leq 18$ atomic %), and includes a main phase having a $Th_2Ni_{17}$ crystal structure. A concentration of the element M in the main phase is 89.6 atomic % or more.

8 Claims, 5 Drawing Sheets

(51) Int. Cl.
  *H01F 1/055* (2006.01)
  *H02K 1/17* (2006.01)
  *H02K 1/27* (2022.01)
  *C22C 38/10* (2006.01)

(52) U.S. Cl.
  CPC ............ *H02K 1/27* (2013.01); *B60L 2220/10* (2013.01); *C22C 38/10* (2013.01); *C22C 2202/00* (2013.01)

(58) Field of Classification Search
  CPC ............... C22C 2202/00; H01F 1/0557; H01F 1/0596; H01F 1/055; B60L 2220/10
  See application file for complete search history.

(56) References Cited

U.S. PATENT DOCUMENTS

| | | | |
|---|---|---|---|
| 2019/0189313 A1 | 6/2019 | Sanada et al. | |
| 2020/0098496 A1* | 3/2020 | Kinoshita | C22C 18/02 |

FOREIGN PATENT DOCUMENTS

| | | |
|---|---|---|
| JP | 2002-313614 | 10/2002 |
| JP | 2004-263232 | 9/2004 |
| JP | 4320701 | 8/2009 |
| JP | 2018-103211 | 7/2018 |
| JP | 2018-125512 | 8/2018 |
| JP | 2019-044259 | 3/2019 |
| JP | 2019-046857 | 3/2019 |
| WO | 2019/058588 | 3/2019 |

OTHER PUBLICATIONS

Givord, et al. "Evidence of Disordered Substitutions in the "Th2Ni17-Type" Structure. Exact Struction Determination of the Th—Ni, Y—Ni and Er—Co Compounds", Journal of the Less Common Metals, vol. 29, 1972, pp. 389-396.

Givord, et al. "X-Ray and Neutron Determination of a So-Called Th2Ni17-Type Structure in the Lutetium-Iron System", Journal of the Less Common Metals, vol. 29, 1972, pp. 361-369.

* cited by examiner

MAGNET MATERIAL, PERMANENT MAGNET, ROTARY ELECTRICAL MACHINE, AND VEHICLE

CROSS-REFERENCE TO RELATED APPLICATION

This application is based upon and claims the benefit of priority from Japanese Patent Application No. 2019-168882, filed on Sep. 17, 2019; the entire contents of which are incorporated herein by reference.

FIELD

Embodiments described herein relate generally to a magnet material, a permanent magnet, a rotary electrical machine, and a vehicle.

BACKGROUND

Permanent magnets are used for products in a wide field including, for example, rotary electrical machines such as a motor and a generator, electrical apparatuses such as a speaker and a measuring device, and vehicles such as an automobile and a railroad vehicle. In recent years, a reduction in size, higher efficiency, and higher output of the above-described products have been required, and high-performance permanent magnets with high magnetization and high coercive force have been desired.

Examples of high-performance permanent magnets include rare-earth magnets such as Sm—Co based magnets and Nd—Fe—B based magnets. In these magnets, Fe and Co contribute to an increase in saturation magnetization. Further, these magnets contain rare-earth elements such as Nd and Sm, which bring about a large magnetic anisotropy that is derived from the behavior of 4f electrons of the rare-earth elements in a crystal field. Consequently, it is possible to obtain a large coercive force.

DETAILED DESCRIPTION

A magnet material in an embodiment is represented by a composition formula 1: $(R_{1-x}Y_x)_aM_bA_c$, where R is at least one element selected from the group consisting of rare-earth elements, M is at least one element selected from the group consisting of Fe and Co, A is at least one element selected from the group consisting of N, C, B, H and P, x is a number satisfying $0.01 \leq x \leq 0.8$, a is a number satisfying $4 \leq a \leq 20$ atomic %, b is a number satisfying b=100−a−c atomic %, and c is a number satisfying $0 \leq c \leq 18$ atomic % and includes a main phase having a $Th_2Ni_{17}$ crystal structure. A concentration of the element M in the main phase is 89.6 atomic % or more.

Hereinafter, embodiments will be explained while referring to the drawings. Note that the drawings are schematically illustrated, and, for example, a relationship between a thickness and a plane dimension, a ratio of thicknesses of respective layers, and the like, are sometimes different from actual ones. Further, in the embodiments, substantially the same components are denoted by the same reference numerals, and explanation thereof will be omitted.

First Embodiment

A magnet material in the embodiment contains an element R (R is a rare-earth element of one kind or more) and an element M (M is at least one element selected from the group consisting of Fe and Co). The above-described magnet material includes a metal structure having a main phase. The main phase is a phase having the highest volume occupancy ratio, among respective crystal phases and an amorphous phase in the magnet material.

It is effective to increase the concentration of the element M in the main phase, in order to increase saturation magnetization of the magnet material. Further, it is important that the main phase should contain the rare-earth element, in order to obtain a large magnetic anisotropy necessary for the magnet material. That is, forming a rare-earth compound having a high element M concentration is very important for fabricating a high-performance permanent magnet.

The magnet material in this embodiment is represented by a composition formula $(R_{1-x}Y_x)_aM_bA_c$, (where R is a rare-earth element of one kind or more, M is at least one element selected from the group consisting of Fe and Co, A is at least one element selected from the group consisting of N, C, B, H, and P, x is a number satisfying $0.01 \leq x \leq 0.8$, a is a number satisfying $4 \leq a \leq 20$ atomic %, b is a number satisfying b=100−a−c atomic %, and c is a number satisfying $0 \leq c \leq 18$ atomic %), by replacing part of R with Y. Incidentally, the magnet material may contain inevitable impurities.

Further, the magnet material in this embodiment includes the main phase having a $Th_2Ni_{17}$ crystal structure, and the concentration of the element M in the main phase is 89.6 atomic % or more. The above-described composition makes it possible to improve the saturation magnetization of the magnet material. The lower limit of the saturation magnetization is not limited in particular, but it is larger than 1.51 T and is further preferably 1.55 T or more.

The element R is a rare-earth element, provides a large magnetic anisotropy to the permanent magnet, and imparts a high coercive force to the permanent magnet. The element R is concretely at least one element selected from the group consisting of lanthanum (La), cerium (Ce), praseodymium (Pr), neodymium (Nd), samarium (Sm), and europium (Eu). Using Pr, Nd, and Sm is preferred, and using Sm, in particular, is preferred. When a plurality of elements including Sm are used as the element R, the concentration of Sm is set to 50 atomic % or more of all the elements applicable as the element R, thereby making it possible to increase the performance, for example, the coercive force of the magnet material. An addition amount a of the element R is set to 4 atomic % or more and 20 atomic % or less. This is because when the addition amount a is less than 4 atomic %, the precipitation of an a-Fe phase becomes prominent to cause a decrease in the coercive force of the permanent magnet, and when the addition amount a is greater than 20 atomic %, the decrease in the saturation magnetization of the permanent magnet becomes prominent.

The magnet material in the embodiment contains yttrium (Y) essentially. Y is an element effective for stabilization of the $Th_2Ni_{17}$ crystal structure. That is, the element Y increases the stability of the $Th_2Ni_{17}$ crystal structure by being replaced with the element R in the main phase mainly to reduce a crystal lattice, or the like. When an addition amount of Y is too small, it is impossible to obtain the effect resulting from the addition of Y. When the addition amount of Y is too large, an anisotropic magnetic field of the permanent magnet decreases significantly. An addition amount x of Y is preferred to be a number satisfying $0.01 \leq x \leq 0.8$ and is particularly preferred to be a number satisfying $0.2 \leq x \leq 0.4$.

50 atomic % or less of the element Y may be replaced with at least one element selected from the group consisting of zirconium (Zr) and hafnium (Hf). Zr and Hf are elements effective for stabilization of a crystal phase.

The element M is at least one element selected from the group consisting of Fe and Co. Changing the ratio of Fe and the ratio of Co makes it possible to improve the saturation magnetization of the permanent magnet. Further, by increasing the ratio of Co, the Curie temperature of the magnet material increases, thereby making it possible to suppress the decrease in the saturation magnetization in a high-temperature region.

20 atomic % or less of the element M may be replaced with at least one element selected from the group consisting of aluminum (Al), silicon (Si), chromium (Cr), manganese (Mn), nickel (Ni), copper (Cu), and gallium (Ga). The above-described elements contribute to the growth of crystal grains composing the main phase, for example.

Further, part of the element M may be replaced with at least one element selected from the group consisting of titanium (Ti), vanadium (V), chromium (Cr), niobium (Nb), tantalum (Ta), molybdenum (Mo), and tungsten (W), for example. This makes it possible to stabilize the $Th_2Ni_{17}$ crystal structure.

The element A is at least one element selected from the group consisting of nitrogen (N), carbon (C), boron (B), hydrogen (H), and phosphorus (P). The element A has a function of entering a crystal lattice of the $Th_2Ni_{17}$ crystal structure to cause at least one of enlargement of the crystal lattice and change in electronic structure, for example. This makes it possible to improve the Curie temperature, the magnetic anisotropy, and the saturation magnetization. The element A does not always have to be added, except for inevitable impurities. An addition amount c of the element A is a number satisfying $0 \leq c \leq 18$ atomic % and is preferably a number satisfying $0 \leq d \leq 10$ atomic %. When the addition amount of the element A exceeds 18 atomic %, the decrease in the saturation magnetization is caused.

The composition of the magnet material is measured by, for example, inductively coupled plasma-atomic emission spectroscopy (ICP-AES), scanning electron microscope-energy dispersive X-ray spectroscopy (SEM-EDX), transmission electron microscope-energy dispersive X-ray spectroscopy (TEM-EDX), scanning transmission electron microscope-energy dispersive X-ray spectroscopy (STEM-EDX), or the like. The volume ratios of the respective phases are determined in a comprehensive manner by using both of observation with an electron microscope or an optical microscope and X-ray diffraction or the like. Further, the concentration of the element M in the main phase can be measured by a method such as SEM-EDX or TEM-EDX, for example.

As above, the magnet material in this embodiment includes the main phase having the $Th_2Ni_{17}$ crystal structure by replacing part of the element R with Y, and the concentration of the element M in the main phase is 89.6 atomic % or more. The reason why a crystal phase having the $Th_2Ni_{17}$ crystal structure, namely a $Th_2Ni_{17}$ phase is generated and the reason why the concentration of the element M in the main phase having the $Th_2Ni_{17}$ phase can be 89.6 atomic % or more will be explained below.

Figure 1:
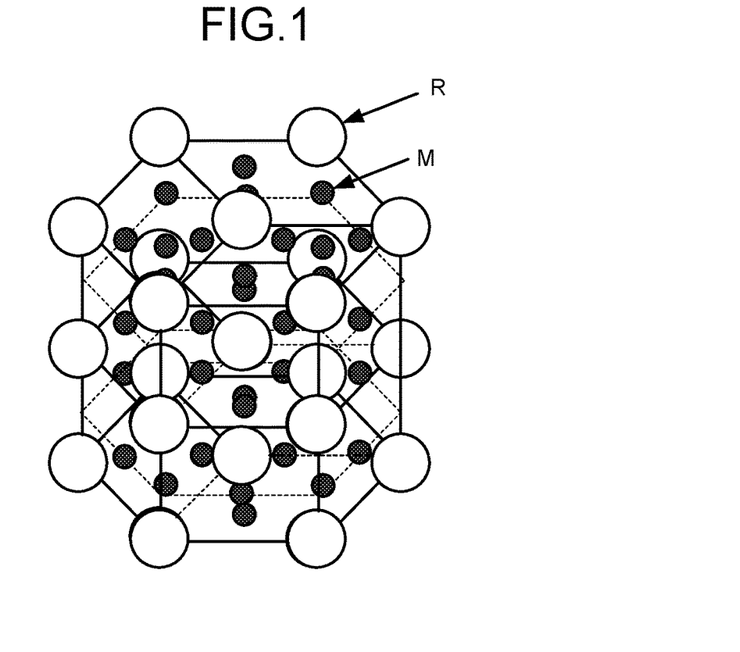
FIG. 1 is a schematic view illustrating a $CaCu_5$ crystal structure.

FIG. 1 is a schematic view illustrating a $CaCu_5$ crystal structure. An intermetallic compound with an element R to element M composition ratio of 1:5 has a hexagonal crystal structure called the $CaCu_5$ crystal structure illustrated in FIG. 1. An $R_2M_{17}$ compound having an element R to element M composition ratio of 2:17 has a crystal structure interrelated with the $CaCu_5$ crystal structure. The $R_2M_{17}$ compound can be obtained as in the following equation in the case where one R atom is replaced with two M atoms and a proportion of this replacement is ⅓ of the total amount of R atoms.

$$RM_5 - \frac{1}{3}(R - 2M) = R_{2/3}M_{(5+2/3)} = R_2M_{17}$$

Figure 2:
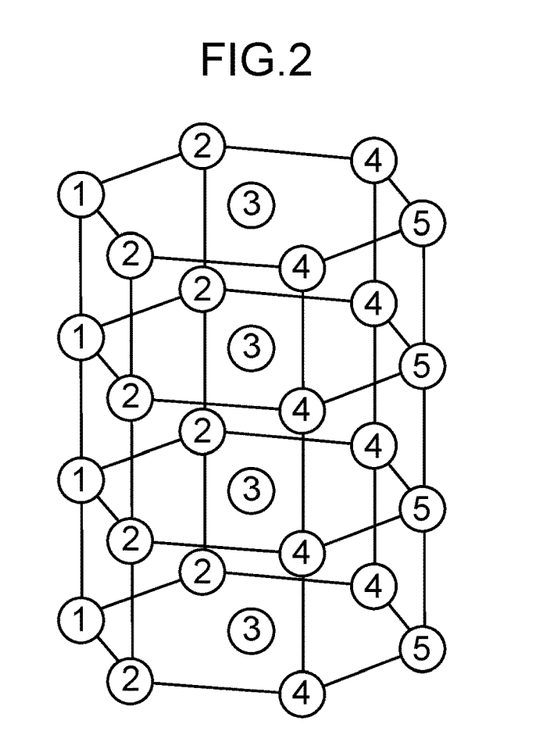
FIG. 2 is a schematic view illustrating rare-earth element sites of the $CaCu_5$ crystal structure.
Figure 3:
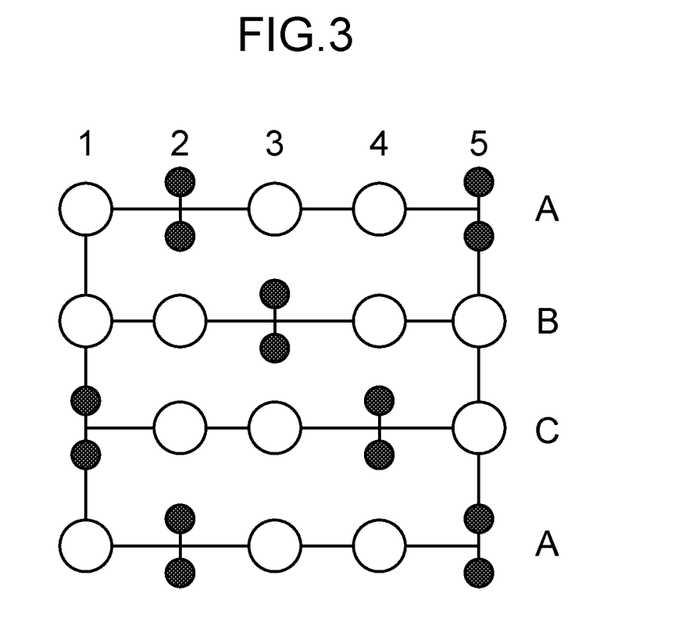
FIG. 3 is a schematic view for explaining a $Th_2Zn_{17}$ crystal structure.
Figure 4:
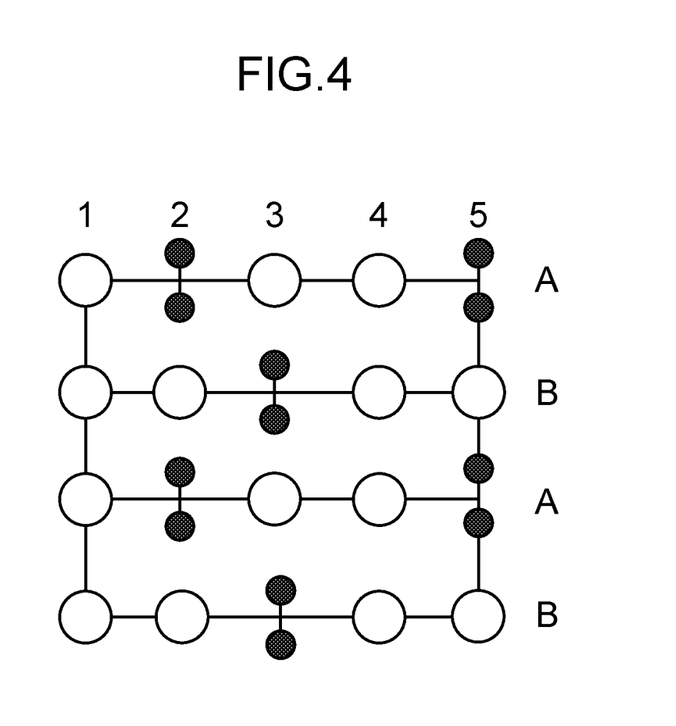
FIG. 4 is a schematic view for explaining a $Th_2Ni_{17}$ crystal structure.

The replaced two M atoms are aligned in a dumbbell configuration in a c-axis direction, to thus be called "dumbbell." It has been known that there are two replacing methods by such a dumbbell in the $R_2M_{17}$ compound. FIG. 2 is a schematic view illustrating R atom sites (rare-earth element sites) of the $CaCu_5$ crystal structure. In FIG. 2, we focus only on the R atoms in a fundamental $RM_5$ crystal lattice. In FIG. 2, a plane where the R atoms at the positions of "2" and "5" are replaced with a dumbbell is set to a plane A, a plane where the R atom at the position of "3" is replaced with a dumbbell is set to a plane B, and a plane where the R atoms at the positions of "1" and "4" are replaced with a dumbbell is set to a plane C. The planes are stacked along the c-axis direction in the order of A, B, C, A, B, C, . . . , and thereby, a rhombohedral crystal structure called a $Th_2Zn_{17}$ crystal structure is obtained. FIG. 3 is a schematic view for explaining the $Th_2Zn_{17}$ crystal structure, where respective numerals are equivalent to the numerals indicating the positions of the rare-earth element sites illustrated in FIG. 2. In the meantime, the planes are stacked in the order of A, B, A, B, A, B, . . . , and thereby a hexagonal crystal structure called the $Th_2Ni_{17}$ crystal structure is obtained. FIG. 4 is a schematic view for explaining the $Th_2Ni_{17}$ crystal structure, where respective numerals are equivalent to the numerals indicating the positions of the rare-earth element sites illustrated in FIG. 2.

In the case of the element M being Fe, an $RFe_5$ compound having the $CaCu_5$ crystal structure is not present, but an $R_2Fe_{17}$ compound is present in all the R atoms, and the $R_2Fe_{17}$ compound tends to have the $Th_2Zn_{17}$ crystal structure on a light rare-earth element side relative to gadolinium (Gd) and tends to have the $Th_2Ni_{17}$ crystal structure on a heavy rare-earth element side relative to gadolinium (Gd). One of the reasons why the crystal structure differs depending on the kind of the rare-earth element is an atomic radius of the rare-earth element site. That is, in the case where the light rare-earth element whose atomic radius of the rare-earth element site is relatively large is selected, the $Th_2Zn_{17}$ crystal structure is generated easily, and in the case where the heavy rare-earth element whose atomic radius of the rare-earth element site is relatively small is selected, on the other hand, the $Th_2Ni_{17}$ crystal structure is generated easily. For the high-performance magnet material, the light rare-earth elements such as La, Ce, Pr, Nd, and Sm are mainly used as the element R, and part of such light rare-earth elements is replaced with Y whose atomic radius is smaller than that of these elements R, thereby making it possible to reduce the average atomic radius of the rare-earth element sites. This is conceivably the reason why the $Th_2Ni_{17}$ crystal structure is generated by replacing part of the element R with Y.

Next, there will be explained a structure in which dumbbells are further added to the $Th_2Zn_{17}$ crystal structure and a structure in which dumbbells are further added to the $Th_2Ni_{17}$ crystal structure. As illustrated in FIG. 3, in the case of the $Th_2Zn_{17}$ crystal structure, by further increasing dumbbells, a portion with two dumbbells continuous in the c-axis direction occurs inevitably. In the case of the element M being Fe, for example, the portion with the two dumbbells continuous in the c-axis direction has a too short interatomic distance between Fe and Fe, which are the closest to each other, and thus is conceived to be disadvantageous in terms of energy. That is, it is conceived that the $Th_2Zn_{17}$ crystal structure hardly has a solid-solution range on a high iron concentration side relative to the side where the element R to element M composition ratio is 2:17 (the concentration of the element M in the compound is 89.5 atomic %). In the meantime, in the case of the $Th_2Ni_{17}$ crystal structure, as illustrated in FIG. 4, no dumbbells are present at the positions of "1" and "4," and thus a replacement with a dumbbell is performed at these positions, thereby making it possible to prevent two dumbbells from continuing in the c-axis direction. For example, a crystal structure of $LuFe_z$ (z=8.5 to 9.5) using Lu as the element R has a solid-solution range on a high iron concentration side relative to the side where the element R to element M composition ratio in the $Th_2Ni_{17}$ type compound is 2:17. This is conceived to be the reason why the concentration of the element M in the $Th_2Ni_{17}$ phase can be increased to 89.6 atomic % or more.

As above, the magnet material in this embodiment is capable of generating the $Th_2Ni_{17}$ phase by mainly using the light rare-earth elements such as La, Ce, Pr, Nd, Sm, and Eu for the element R and replacing part of the light rare-earth elements with Y, and is capable of increasing the concentration of the element M in the main phase to 89.6 atomic % or more.

The light rare-earth elements such as La, Ce, Pr, Nd, Sm, and Eu are mainly used for the element R and part of the light rare-earth elements is replaced with Zr, Hf, and Sc, and thereby the $Th_2Ni_{17}$ phase is generated. In contrast to this, an effect resulting from the replacement with Y for the element R is more excellent than that resulting from the replacement with Zr, Hf, and Sc for the element R. This reason is conceived because even by the replacement with Zr, Hf, and Sc, the $Th_2Ni_{17}$ phase is generated by reducing the average atomic radius of the previously-described rare-earth element sites, but Zr, Hf, and Sc each are a transition metal element and some of them occupy element M sites. Occupying the element M sites with Zr, Hf, and Sc ends up reducing the concentration of the element M in the compound, failing to increase the concentration of the element M to 89.6 atomic % or more. In the meantime, the atomic radius of Y is smaller than that of the element R, but is larger than that of Zr, Hf, and Sc, which makes Y impossible to occupy the element M sites. It is conceived that this makes it possible to increase the concentration of the element M in the main phase to 89.6 atomic % or more.

In the case where the magnet material contains the element A, the element A has a high affinity for Zr, Hf, and Sc and a nitride, a carbide, a boride, and so on that do not contribute to the saturation magnetization of the magnet material, for example, ZrN, ZrC, $HfB_2$, and so on are generated easily, resulting in a cause to impair the saturation magnetization of the magnet material. In contrast to this, the magnet material in this embodiment enables the element A to enter the crystal lattice of the $Th_2Ni_{17}$ phase while suppressing the generations of a nitride, a carbide, and a boride, and is capable of improving the magnetic properties such as the Curie temperature and the magnetic anisotropy without impairing the saturation magnetization.

In the magnet material provided with the main phase having the $Th_2Ni_{17}$ crystal structure, since the concentration of the element M is high, at least one hetero-phase selected from the group consisting of an α-Fe phase and an α-(Fe, Co) phase is likely to precipitate. When the hetero-phase precipitates, the concentration of the element M in the main phase decreases, which causes a decrease in the saturation magnetization of the main phase. Further, the precipitation of the hetero-phase causes a decrease in the coercive force of the permanent magnet. The total amount of the hetero-phase is preferably 10 vol % or less, for example.

Next, there will be explained an example of a manufacturing method of the permanent magnet using the magnet material in the embodiment. First, an ingot alloy containing predetermined amounts of the element R, Y, and the element M is fabricated. The ingot alloy can be obtained by, for example, an arc melting method, a high-frequency induction melting method, a gas atomization method, a metal mold casting method, or the like.

The ingot alloy obtained in this manner sometimes causes decreases in the saturation magnetization and the anisotropic magnetic field because a lot of hetero-phases such as an α-(Fe, Co) phase other than the $Th_2Ni_{17}$ phase precipitate. In contrast to this, the ingot alloy is melted to be quenched at a rate of $1\times10^{-2}$ K/sec or more and $1\times10^{-7}$ K/sec or less, thereby making it possible to reduce the precipitation amount of the α-(Fe, Co) phase. As a quenching method, by a strip cast method, for example, the ingot alloy can be cooled at a predetermined rate. By controlling a rotation speed of a roll, a cooling rate of the molten metal can be controlled. The roll may be either a single-roll type or a twin-roll type.

There may be included a step of performing a heat treatment on the ingot alloy obtained in the above-described step or a quenched ribbon at a temperature of 400° C. or more and 1200° C. or less for two hours or more and 120 hours or less. By this heat treatment, the $Th_2Ni_{17}$ phase is homogenized, resulting in that both the properties, namely, the saturation magnetization and the anisotropic magnetic field further improve.

It is also possible to make the element A enter the ingot alloy obtained in the above-described step or the quenched ribbon. Concretely, in the case where nitrogen is used as the element A, a nitrogen gas, an ammonia gas, or the like is used as a nitrogen source and a heat treatment is performed at a temperature of 200° C. or more and 600° C. or less for one hour or more and 24 hours or less to nitride the ingot alloy or the quenched ribbon. In the case where carbon is used as the element A, a $C_2H_2(CH_4, C_3H_8, CO)$ gas or a thermal decomposition gas of methanol is used as a carbon source and a heat treatment is performed at a temperature of 300° C. or more and 600° C. or less for one hour or more and 24 hours or less to carbonize the ingot alloy or the quenched ribbon. Besides, solid carburizing using a carbon powder or molten salt carburizing using KCN, NaCN can be used. Also in the case of B, H, and P, normal boronization, hydrogenation, and phosphorization can be performed. When making the element A enter the ingot alloy or the quenched ribbon, the ingot alloy or the quenched ribbon is pulverized beforehand to have an average particle size of about 10 μm or more and 100 μm or less, thereby enabling efficient entrance of the element A.

By the above-described step, the magnet material is manufactured. Further, the permanent magnet is manufactured by using the above-described magnet material. For example, the above-described magnet material is pulverized and then is subjected to a heat treatment such as sintering, resulting in that a sintered magnet containing a sintered compact of the magnet material is manufactured. Further, a bond magnet containing the above-described magnet material is manufactured by pulverizing the above-described magnet material and solidifying the pulverized magnet material with resin or the like.

Second Embodiment

The permanent magnet using the magnet material in the first embodiment can be used for various motors and generators. Further, it is also possible to use the permanent magnet as a stationary magnet and a variable magnet of a variable magnetic flux motor and a variable magnetic flux generator. Various motors and generators are formed by using the above-described permanent magnet. When the above-described permanent magnet is applied to a variable magnetic flux motor, the techniques disclosed in, for example, Japanese Patent Application Laid-open No. 2008-29148 and Japanese Patent Application Laid-open No. 2008-43172 are applicable to a configuration and a drive system of the variable magnetic flux motor.

Figure 5:
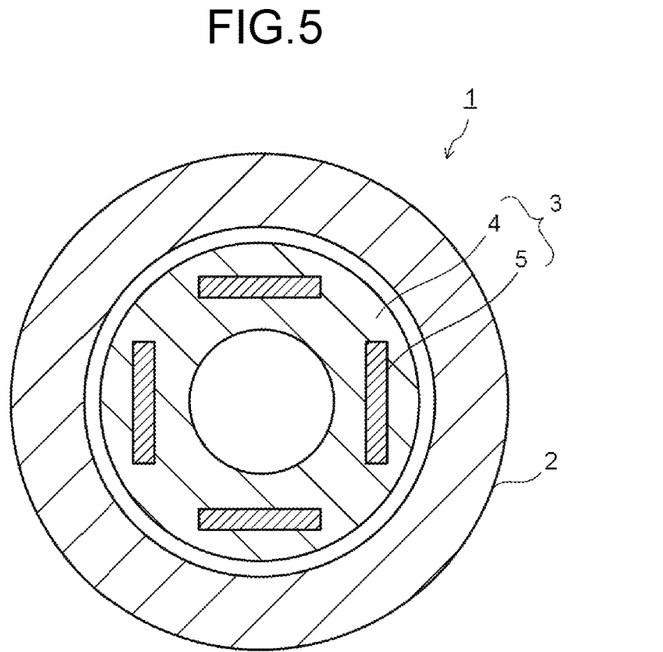
FIG. 5 is a schematic view illustrating an example of a permanent magnet motor.

Next, motors and generators including the permanent magnet will be explained with reference to the drawings. FIG. 5 is a schematic view illustrating a permanent magnet motor. In a permanent magnet motor 1 illustrated in FIG. 5, a rotor 3 is disposed in a stator 2. In an iron core 4 of the rotor 3, permanent magnets 5 are disposed. By using the above-described permanent magnets, high efficiency, miniaturization, a reduction in cost, and the like of the permanent magnet motor 1 can be achieved based on the properties and the like of the respective permanent magnets.

Figure 6:
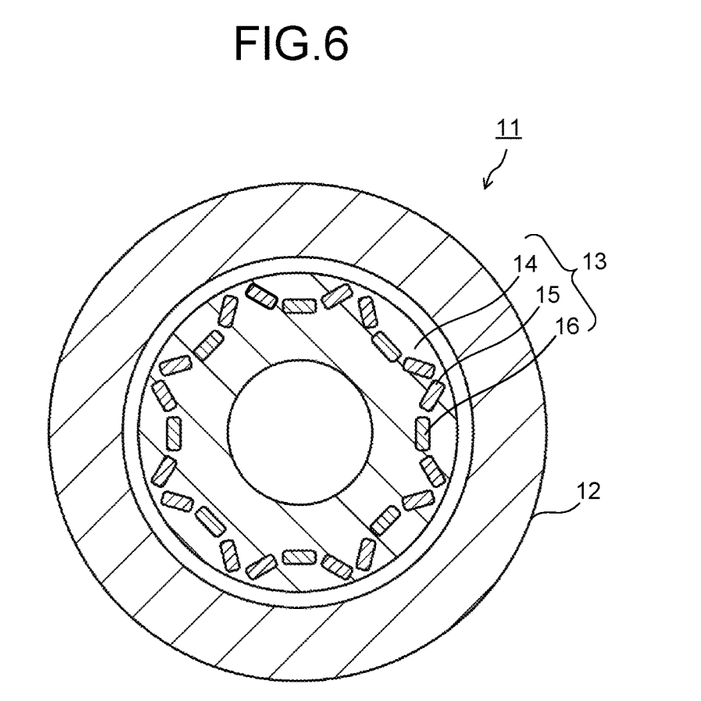
FIG. 6 is a schematic view illustrating an example of a variable magnetic flux motor.

FIG. 6 is a schematic view illustrating a variable magnetic flux motor. In a variable magnetic flux motor 11 illustrated in FIG. 6, a rotor 13 is disposed in a stator 12. In an iron core 14 of the rotor 13, the permanent magnets are disposed as stationary magnets 15 and variable magnets 16. A magnetic flux density (magnetic flux amount) of the variable magnet 16 is variable. A magnetization direction of the variable magnet 16 is orthogonal to a Q-axis direction, and thus the magnets are not affected by a Q-axis current, and can be magnetized by a D-axis current. A magnetization winding (not illustrated) is provided on the rotor 13. A structure is made in which by passing an electric current from a magnetization circuit to this magnetization winding, its magnetic field acts directly on the variable magnets 16.

Using the above-described permanent magnet makes it possible to obtain a coercive force suitable for the stationary magnet 15. When the above-described permanent magnet is applied to the variable magnet 16, it is sufficient that, for example, the coercive force is controlled in a range of 100 kA/m or more and 500 kA/m or less by changing manufacturing conditions. Incidentally, in the variable magnetic flux motor 11 illustrated in FIG. 6, the above-described permanent magnet can be used for both the stationary magnet 15 and the variable magnet 16, but the above-described permanent magnet may be used for either of the magnets. The variable magnetic flux motor 11 is capable of outputting large torque with a small apparatus size, so that it is suitable for a motor of a hybrid vehicle, an electric vehicle, or the like required to have a high-output and small-sized motor.

Figure 7:
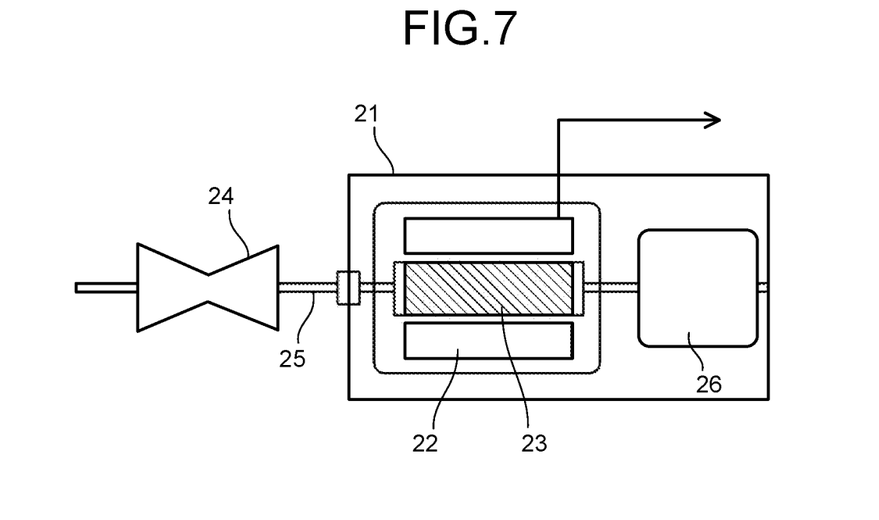
FIG. 7 is a schematic view illustrating an example of a generator.

FIG. 7 is a schematic view illustrating a generator. A generator 21 illustrated in FIG. 7 includes a stator 22 using the above-described permanent magnet. A rotor 23 disposed inside the stator 22 is connected via a shaft 25 to a turbine 24 provided at one end of the generator 21. The turbine 24 rotates by, for example, fluid supplied from the outside. Incidentally, in place of using the turbine 24 to rotate by the fluid, transmitting dynamic rotation such as regenerated energy of an automobile also enables the shaft 25 to rotate. Various publicly-known configurations can be employed for the stator 22 and the rotor 23.

The shaft 25 is in contact with a commutator (not illustrated) disposed on the side opposite to the turbine 24 with respect to the rotor 23, so that an electromotive force generated by rotation of the rotor 23 is boosted to a system voltage and is transmitted as an output from the generator 21 via an isolated bus and a main transformer (not illustrated). The generator 21 may be either an ordinary generator or a variable magnetic flux generator. Incidentally, the rotor 23 generates an electrostatic charge by static electricity from the turbine 24 and an axial current accompanying power generation. Therefore, the generator 21 includes a brush 26 for discharging the electrostatic charge of the rotor 23.

As described above, by applying the above-described permanent magnet to the generator, effects such as high efficiency, miniaturization, and a reduction in cost are obtained.

Figure 8:
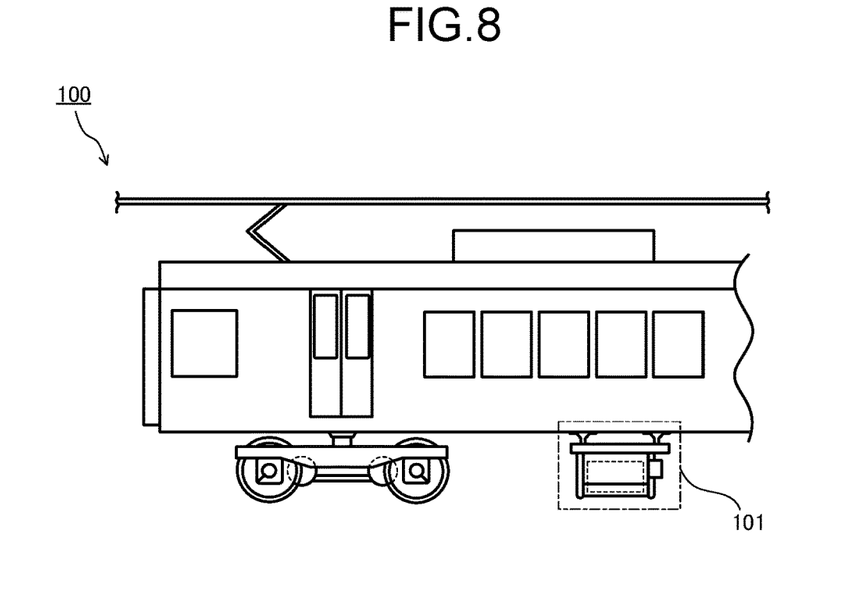
FIG. 8 is a schematic view illustrating an example of a railway vehicle.

The above-described rotary electrical machine may be mounted in, for example, a railway vehicle (one example of the vehicle) to be used for railway traffic. FIG. 8 is a schematic view illustrating an example of a railway vehicle 100 including a rotary electrical machine 101. As the rotary electrical machine 101, any of the motors in FIGS. 5 and 6, the generator in FIG. 7, and the like described above can be used. When the above-described rotary electrical machine is mounted as the rotary electrical machine 101, the rotary electrical machine 101 may be used as, for example, a motor that outputs driving force by using electric power supplied from an overhead wire or electric power supplied from a secondary battery mounted in the railway vehicle 100, or may be used as a generator that converts kinetic energy into electric power and supplies the electric power to various loads in the railway vehicle 100. Using such a high-efficient rotary electrical machine as the rotary electrical machine in the embodiment enables the railway vehicle to travel in an energy-saving manner.

Figure 9:
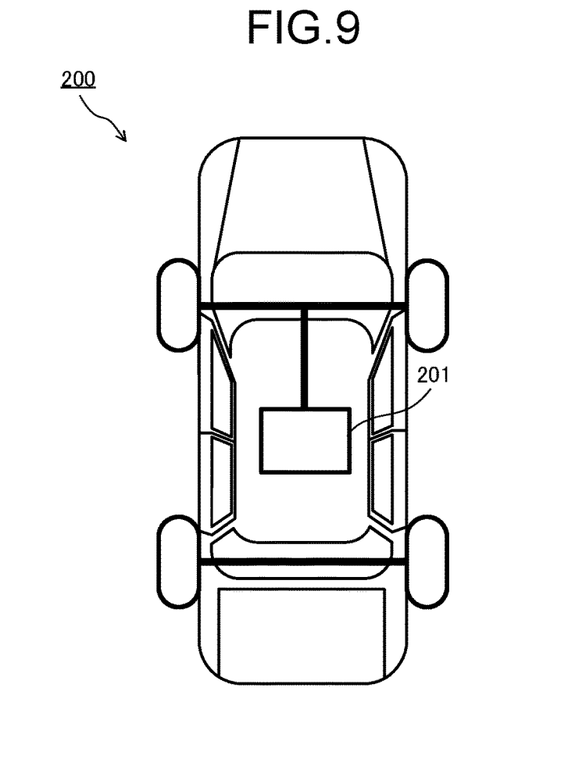
FIG. 9 is a schematic view illustrating an example of an automobile.

The above-described rotary electrical machine may be mounted in an automobile (another example of the vehicle) such as a hybrid vehicle or an electric vehicle. FIG. 9 is a schematic view illustrating an example of an automobile 200 including a rotary electrical machine 201. As the rotary electrical machine 201, any of the motors in FIGS. 5 and 6, the generator in FIG. 7, and the like described above can be used. When the above-described rotary electrical machine is mounted as the rotary electrical machine 201, the rotary electrical machine 201 may be used as a motor that outputs driving force of the automobile 200 or a generator that converts kinetic energy when the automobile 200 travels into electric power.

EXAMPLES

Examples 1 to 18

Raw materials were weighed to obtain compositions in Examples 1 to 18 illustrated in Table 1, and ingot alloys were fabricated by the arc melting method. Then, each of the ingot alloys was used to fabricate a quenched ribbon by the strip cast method using a single-roll type liquid quenching and solidifying apparatus. A roll peripheral speed was set to 2 m/s. A heat treatment was performed on each of the quenched ribbons in an Ar atmosphere at a temperature of 1100° C. for four hours. Each of the heat-treated ribbons was pulverized in a mortar to be subjected to a crystal structure analysis by an X-ray diffraction (XDR) measurement using an X ray with CuKα set as a radiation source, and then it was confirmed that the main phase is the $Th_2Ni_{17}$ phase in all the samples. Further, it was confirmed from an area ratio in a SEM image that the precipitated amount of the α-(Fe, Co) phase is less than 10 vol % in all the samples.

Magnetization of each of the heat-treated ribbons was measured by a vibrating sample magnetometer (VSM) at room temperature and saturation magnetization Ms was evaluated from a measurement result using a saturation asymptotic law. The concentration of each element in the main phase was evaluated by SEM-EDX. Concretely, the heat-treated ribbon was measured at five points in each one visual field and the measurement was performed in three visual fields, and thereby the concentrations of the respective elements were found from an average concentration of the concentrations at the 15 points in total. Incidentally, the concentration of the element M is the total concentration of Fe and Co.

Comparative Examples 1, 2

Next, raw materials were weighed to obtain compositions in Comparative examples 1, 2 illustrated in Table 1, and alloys were fabricated by the arc melting method. Samples were fabricated through the same procedures as in Examples 1 to 18 except for the fact that the compositions are different. Measurement results in Examples 1 to 18 and Comparative examples 1, 2 are illustrated in Table 1.

As is clear from Table 1, the concentration of the element M in the main phase is less than 89.6 atomic % and the saturation magnetization is low in the case where the element R is not replaced with Y (Comparative example 1) and the case where part of the element R is replaced with Zr (Comparative example 2), for example. On the other hand, in the case where part of the element R is replaced with Y (Examples 1 to 18), the concentration of the element M in the main phase is 89.6 atomic % or more and the saturation magnetization is higher than that in Comparative examples 1, 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnet material represented by a composition formula 1: $(R_{1-x}Y_x)_a M_b A_c$, where R is at least one element selected from the group consisting of rare-earth elements, M is at least one element selected from the group consisting of Fe and Co, A is at least one element selected from the group consisting of N, C, B, H and P, x is a number satisfying $0.01 \leq x \leq 0.8$, a is a number satisfying $4 \leq a \leq 20$ atomic %, b is a number satisfying b=100−a−c atomic %, and c is a number satisfying $0 \leq c \leq 18$ atomic %,

TABLE 1

| | Composition | Concentration of element M in main phase (atomic %) | Saturation magnetization (T) |
|---|---|---|---|
| Example 1 | $(Sm_{0.77}Y_{0.23})_{10.4}(Fe_{0.82}Co_{0.18})_{89.6}$ | 89.8 | 1.57 |
| Example 2 | $(Sm_{0.77}Y_{0.23})_{10.7}(Fe_{0.78}Co_{0.22})_{89.3}$ | 89.7 | 1.58 |
| Example 3 | $(Sm_{0.79}Nd_{0.02}Y_{0.19})_{10.5}(Fe_{0.75}Co_{0.25})_{89.5}$ | 89.7 | 1.55 |
| Example 4 | $(Sm_{0.78}Ce_{0.03}Y_{0.19})_{9.9}(Fe_{0.75}Co_{0.25})_{90.1}$ | 89.9 | 1.58 |
| Example 5 | $(Sm_{0.77}Y_{0.23})_{10.6}(Fe_{0.84}Co_{0.15}Mn_{0.01})_{89.4}$ | 89.6 | 1.56 |
| Example 6 | $(Sm_{0.78}Y_{0.22})_{10.3}(Fe_{0.74}Co_{0.25}Cu_{0.01})_{89.7}$ | 90.0 | 1.59 |
| Example 7 | $(Sm_{0.84}Y_{0.16})_{10.4}(Fe_{0.78}Co_{0.20}Si_{0.02})_{89.6}$ | 89.8 | 1.59 |
| Example 8 | $(Sm_{0.68}Y_{0.32})_{11.1}(Fe_{0.76}Co_{0.23}Mo_{0.01})_{88.9}$ | 89.6 | 1.55 |
| Example 9 | $(Sm_{0.85}Y_{0.15})_{10.5}(Fe_{0.75}Co_{0.23}Nb_{0.02})_{89.5}$ | 89.9 | 1.58 |
| Example 10 | $(Sm_{0.82}Y_{0.18})_{10.7}(Fe_{0.81}Co_{0.18}Ti_{0.01})_{89.3}$ | 89.7 | 1.56 |
| Example 11 | $(Sm_{0.81}Y_{0.17}Hf_{0.02})_{11.0}(Fe_{0.82}Co_{0.18})_{89.0}$ | 89.9 | 1.57 |
| Example 12 | $(Sm_{0.78}Y_{0.17}Zr_{0.05})_{10.1}(Fe_{0.87}Co_{0.13})_{89.9}$ | 89.7 | 1.55 |
| Example 13 | $(Sm_{0.77}Y_{0.23})_{9.5}(Fe_{0.74}Co_{0.26})_{89.4}P_{1.1}$ | 90.1 | 1.59 |
| Example 14 | $(Sm_{0.77}Y_{0.23})_{10.0}(Fe_{0.82}Co_{0.18})_{86.5}C_{3.5}$ | 89.6 | 1.55 |
| Example 15 | $(Sm_{0.84}Y_{0.16})_{9.7}(Fe_{0.79}Co_{0.21})_{83.5}N_{6.8}$ | 89.7 | 1.55 |
| Example 16 | $(Sm_{0.77}Y_{0.23})_{9.6}(Fe_{0.74}Co_{0.26})_{86.2}N_{4.2}$ | 89.7 | 1.56 |
| Example 17 | $(Sm_{0.77}Y_{0.23})_{10.7}(Fe_{0.82}Co_{0.18})_{88.6}C_{0.7}$ | 89.9 | 1.58 |
| Example 18 | $(Sm_{0.84}Y_{0.16})_{10.1}(Fe_{0.79}Co_{0.21})_{88.5}B_{1.4}$ | 89.6 | 1.56 |
| Comparative example 1 | $Sm_{10.8}(Fe_{0.8}Co_{0.2})_{89.2}$ | 88.8 | 1.49 |
| Comparative example 2 | $(Sm_{0.77}Zr_{0.23})_{10.4}(Fe_{0.8}Co_{0.2})_{89.6}$ | 89.1 | 1.51 | the magnet material comprising
a main phase having a $Th_2Ni_{17}$ crystal structure, wherein
a concentration of the element M in the main phase to all elements in the main phase is 89.6 atomic % or more.

2. The magnet material according to claim 1, wherein the element R is at least one element selected from the group consisting of La, Ce, Pr, Nd, Sm and Eu.

3. The magnet material according to claim 1, wherein 50 atomic % or less of the element Y is replaced with at least one element selected from the group consisting of Zr and Hf.

4. The magnet material according to claim 1, wherein a part of the element M is replaced with at least one element selected from the group consisting of Ti, V, Cr, Nb, Ta, Mo and W.

5. The magnet material according to claim 1, wherein 20 atomic % or less of the element M is replaced with at least one element selected from the group consisting of Al, Si, Cr, Mn, Ni, Cu and Ga.

6. A permanent magnet comprising the magnet material according to claim 1.

7. A permanent magnet comprising a sintered compact of the magnet material according to claim 1.

8. The magnet material according to claim 1, wherein a concentration of nitrogen in the magnet material to all elements in the magnet material is 6.8 atomic % or less.

* * * * *